US012480379B2

(12) United States Patent
Thomas et al.

(10) Patent No.: US 12,480,379 B2
(45) Date of Patent: Nov. 25, 2025

(54) SYSTEMS FOR A LOW FRICTION SLIP SLEEVE AND RELATED METHODS

(71) Applicant: The Gund Company, Inc., St. Louis, MO (US)

(72) Inventors: Devon Thomas, O'Fallon, MO (US); Mike Moran, Lake Saint Louis, MO (US); Alejandro Vega Gonzales, Querétaro (MX); Solomon Chiang, Oakville (CA)

(73) Assignee: The Gund Company, Inc., St. Louis, MO (US)

( * ) Notice: Subject to any disclaimer, the term of this patent is extended or adjusted under 35 U.S.C. 154(b) by 119 days.

(21) Appl. No.: 18/341,728

(22) Filed: Jun. 26, 2023

(65) Prior Publication Data

US 2023/0417120 A1 Dec. 28, 2023

Related U.S. Application Data

(60) Provisional application No. 63/355,294, filed on Jun. 24, 2022.

(51) Int. Cl.
*E21B 33/129* (2006.01)

(52) U.S. Cl.
CPC ................... *E21B 33/129* (2013.01)

(58) Field of Classification Search
CPC ... E21B 33/1293; E21B 33/129; B29C 70/32; B29C 70/326
See application file for complete search history.

(56) References Cited

U.S. PATENT DOCUMENTS

| 3,076,669 | A | * | 2/1963 | Schlein | E04D 13/08 |
| | | | | | 4/DIG. 16 |
| 3,115,271 | A | * | 12/1963 | Anderson | B29C 53/585 |
| | | | | | 220/675 |
| 4,362,187 | A | * | 12/1982 | Harris | B29C 69/002 |
| | | | | | 277/625 |
| 10,024,134 | B2 | | 7/2018 | Webster et al. | |
| 10,184,601 | B2 | * | 1/2019 | Brown | F16L 21/08 |
| 11,015,415 | B2 | | 5/2021 | Greenlee et al. | |
| 2023/0064297 | A1 | * | 3/2023 | Davison | B29C 70/30 |

* cited by examiner

*Primary Examiner* — D. Andrews
(74) *Attorney, Agent, or Firm* — Lewis Rice LLC (57) ABSTRACT

An improved system for well boring and related hydraulic fracturing processes, which typically includes a sleeve that may be formed with some composite material to provide a stable and consistent low-friction surface, which surface may potentially improve the seating and uniform breaking of slip segments in a fracking plug application. The system may be formed, in part, by a filament winding process.

18 Claims, 14 Drawing Sheets

SYSTEMS FOR A LOW FRICTION SLIP SLEEVE AND RELATED METHODS

CROSS-REFERENCE TO RELATED APPLICATIONS

This application claims the benefit of U.S. Prov. Pat. App. Ser. No. 63/355,294, filed Jun. 24, 2022, the entire disclose of which is incorporated herein by reference.

BACKGROUND OF THE INVENTION

Field of the Invention

This disclosure generally relates to an improved system for well boring and related hydraulic fracturing processes. More particularly, this disclosure relates to a sleeve that may be formed with some composite material to provide a stable and consistent low-friction surface, which surface may potentially improve the seating and uniform breaking of slip segments in a fracking plug application.

Description of the Related Art

Hydraulic fracturing (also known as fracking) is a well stimulation technique involving the fracturing of bedrock formations by a pressurized liquid. The process typically involves the high-pressure injection of a fracking fluid (which may include water with sand or other proppants suspended therein with the aid of thickening agents) into a wellbore to create cracks in deep-rock formations around the wellbore. These cracks may allow for natural gas, petroleum, and brine deposits in the rock formations to flow more freely, or otherwise be more accessible for recovery. When the hydraulic pressure is removed from the well, small grains of hydraulic fracturing proppants tend to hold the fractures open.

In order to pump the high-pressure fluids into the wellbore, a frac plug may be used to isolate a section of the wellbore below or beyond a target zone in order to treat that zone. Such a plug is described in, for example, U.S. Pat. No. 10,024,134, the entire disclosure of which is hereby incorporated by reference in its entirety. The frac plug is typically inserted into the wellbore being addressed and lowered to the point where the well operator would like to create an obstruction. The plug is then set into the wellbore, which setting process holds the plug in place during subsequent processes, such as the introduction of fracking fluid.

Figure 1:
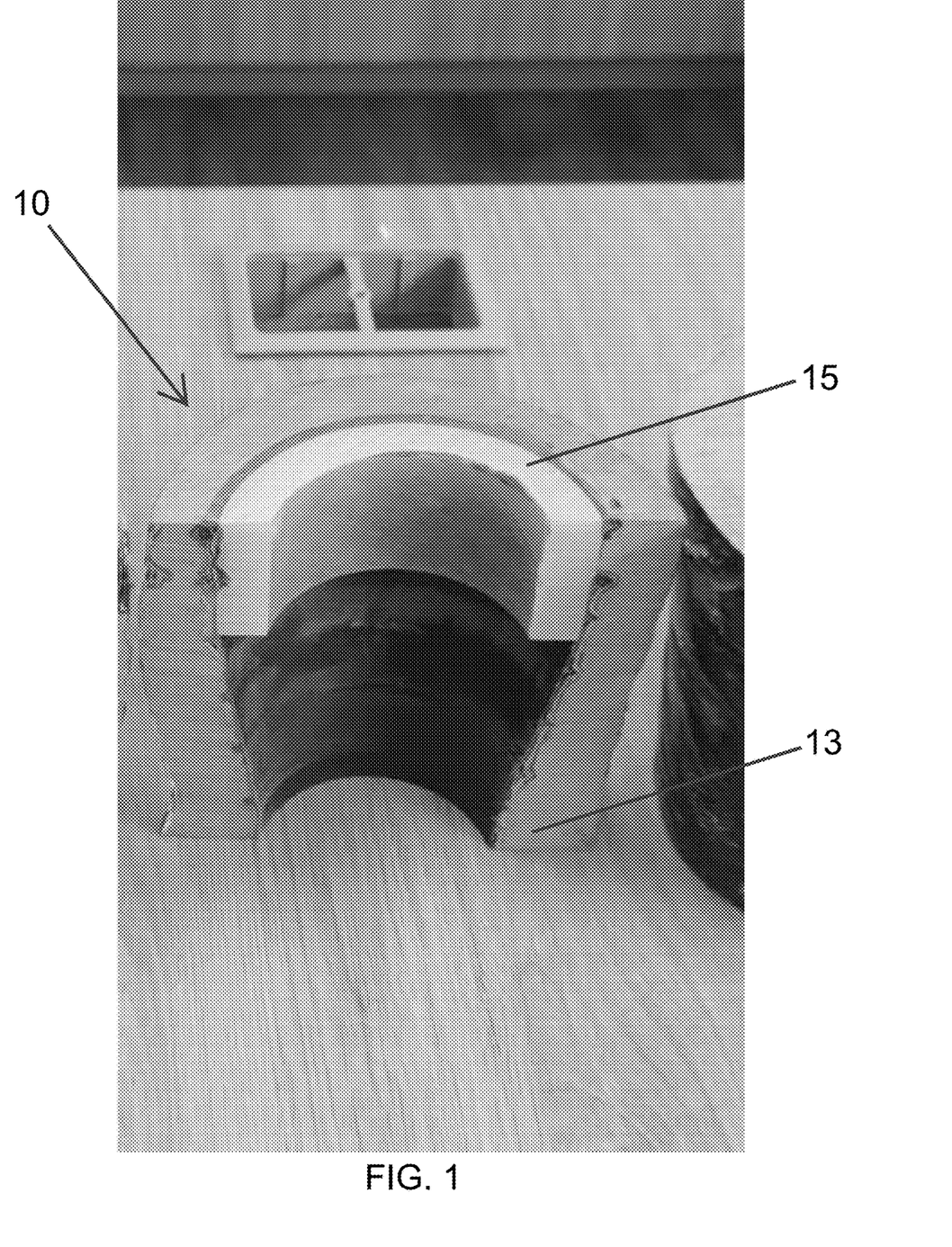
FIG. 1 depicts a cross-sectional view of an intermediate product created during prior art slip fabrication.

The process for setting a frac plug typically involves positioning portions of the plug against the sidewalls of the wellbore in a manner that resists further movement of the plug in the wellbore. In some fracking processes, a slip assembly may be used. A slip assembly typically includes two principal parts: a cone and a slip. As shown in FIG. 1, the slip assembly is typically comprised by a bulk material (13) that may protect the slip assembly (10) while providing most of the slip assembly's mechanical properties. The cone portion of the slip assembly is typically a portion of the slip assembly that is formed from a rigid material and shaped like a cone. The slip portion is typically located near the cone and shaped at least somewhat like a ring. The slip, when used in a frac plug as a securing means, may be positioned on the narrower side of the cone such that the narrow portion of the cone may enter into the slip, thereby expanding the slip. The slip assembly is typically fabricated in various parts, and in some cases, may be formed using a spacer and some composite materials.

Figure 2:
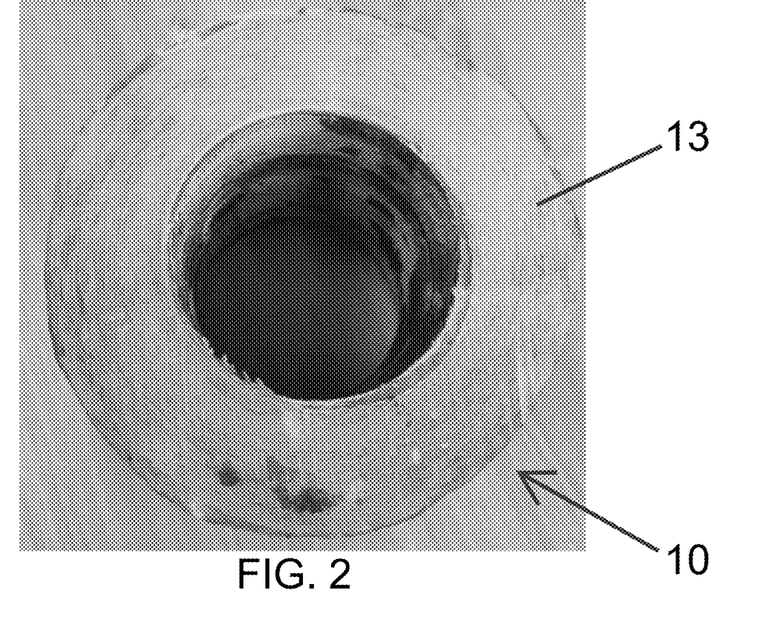
FIG. 2 depicts a top perspective view of the intermediate product depicted in FIG. 1.
Figure 3:
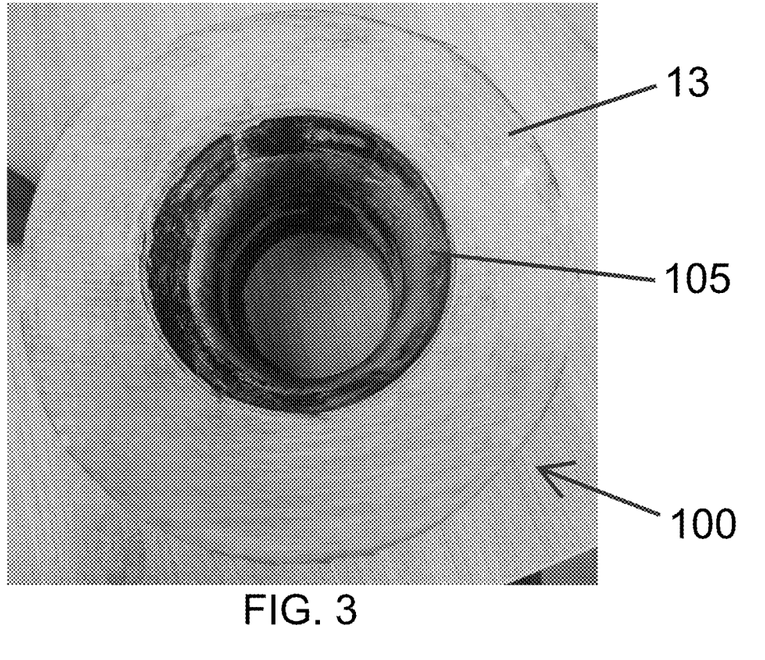
FIG. 3 depicts a top perspective view of an embodiment of a low-friction intermediate product in accordance with this disclosure.

An intermediate product created during slip assembly fabrication is shown in FIGS. 1 and 2, and this combination may be considered to be a slip assembly (10). The end products may include one or more features to facilitate subsequent expansion of the slip or fragmenting of the slip into individual slip segments. This expansion, whether fragmenting or not, will typically secure the slip into the sidewalls of the wellbore, thereby securing the frac plug at the same time. Such frac plugs tend to rely upon the proper operation of one or more slips to secure a given frac plug in place in the relevant wellbore, so that the frac plug may perform its relevant tasks, such as sectioning off a portion of the wellbore.

This process of a slip assembly (10) riding onto and up the exterior of their related cone is not without difficulty. For example, the movement of the slip up the cone may be arrested, or made more difficult, by friction. In such a case, the frac plug may be rendered inoperable or the process of securing the frac plug may be made more difficult or time consuming. Further, the process of slips sliding up the cone may be somewhat unguided. This issue, combined with irregular drag on the slip due to an irregular friction profile on the surfaces of material that form the slip may result in similarly irregular expansion or fragmentation of the slip. Such irregular expansion or fragmentation may, in turn, lead to a frac plug that is not sufficiently secured in the wellbore to fulfil the frac plug's roles.

Accordingly, there is a need in the fracking art for a frac plug system that may provide a more consistent coefficient of friction for the slip to move within the structure of the frac plug. Further, there is a need for an efficient and workable manufacturing process to make one or more slips having improved qualities.

SUMMARY OF THE INVENTION

The following is a summary of the invention to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a low-friction sleeve for forming a slip assembly of a frac plug, the low-friction comprising: a main body having a truncated cone shape with a hollow interior; a first end that is a substantially circular opening having a first diameter and forming a first end of the hollow interior; a second end that is a substantially circular opening having a second diameter and forming a second end of the hollow interior; and a single, continuous thread formed around the main body, wherein the first diameter is larger than the second diameter.

In a further embodiment, the low-friction sleeve for forming a slip assembly of a frac plug includes one or more filaments wrapped around the main body.

In a still further embodiment, one or more filaments surrounds the main body.

Because of these and other problems in the art, described herein, among other things, is an intermediate product for forming a slip assembly of a frac plug, the intermediate product comprising: a first sleeve, the first sleeve comprising: a first main body having a truncated cone shape with a hollow interior; a first end that is a substantially circular opening having a first diameter and forming a first end of the hollow interior; and a second end that is a substantially circular opening having a second diameter and forming a second end of the hollow interior, wherein the first diameter is larger than the second diameter; a spacer located within and in contact with the first sleeve, the spacer having a ring shape; and a composite outer matrix formed on the outside surface of the first sleeve, the composite outer matrix comprising at least one filament and a resin; wherein the intermediate product has a truncated cone shape.

In a further embodiment, the intermediate product for forming a slip assembly of a frac plug includes a mandrel onto which the intermediate product is mounted, wherein the mandrel is positioned within the interior of the spacer and the first sleeve.

In still a further embodiment, the intermediate product for forming a slip assembly of a frac plug includes a second intermediate product for forming a slip assembly of a frac plug mounted on the mandrel.

In still a further embodiment, the second intermediate product is oriented on the mandrel in an opposite direction compared to orientation of the first intermediate product on the mandrel.

In still a further embodiment, the first sleeve includes a single, continuous thread formed around the first main body.

In still a further embodiment, the first sleeve includes a single, continuous thread formed around the first main body.

In still a further embodiment, the intermediate product for forming a slip assembly of a frac plug includes a cone.

Because of these and other problems in the art, described herein, among other things, is a method of making an intermediate product for forming a slip assembly of a frac plug, the method comprising: forming a low-friction sleeve, the low-friction sleeve comprising:

a main body having a truncated cone shape with a hollow interior; a first end that is a substantially circular opening having a first diameter and forming a first end of the hollow interior; a second end that is a substantially circular opening having a second diameter and forming a second end of the hollow interior; and a single, continuous thread formed around the main body, wherein the first diameter is larger than the second diameter; and placing the low-friction sleeve on a mandrel.

An embodiment of the method of making an intermediate product for forming a slip assembly of a frac plug includes a step of placing a spacer within the low-friction sleeve on the mandrel.

An further embodiment of the method of making an intermediate product for forming a slip assembly of a frac plug includes a step of filament winding onto the low-friction sleeve on the mandrel using one filament and a resin.

An further embodiment of the method of making an intermediate product for forming a slip assembly of a frac plug includes a step of removing the low-friction sleeve from the mandrel.

An further embodiment of the method of making an intermediate product for forming a slip assembly of a frac plug includes a step of molding a compound onto the low-friction sleeve on the mandrel.

An further embodiment of the method of making an intermediate product for forming a slip assembly of a frac plug includes a step of placing a second low-friction sleeve on the mandrel.

An further embodiment of the method of making an intermediate product for forming a slip assembly of a frac plug includes a step of filament winding the low-friction sleeve and the second low-friction sleeve on the mandrel using one filament and a resin.

An further embodiment of the method of making an intermediate product for forming a slip assembly of a frac plug includes a step of removing the low-friction sleeve and the second low-friction sleeve from the mandrel.

An further embodiment of the method of making an intermediate product for forming a slip assembly of a frac plug includes a step of separating the low-friction sleeve from the second low-friction sleeve.

An further embodiment of the method of making an intermediate product for forming a slip assembly of a frac plug includes a step of molding a compound onto the low-friction sleeve and the second low-friction sleeve on the mandrel.

DETAILED DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

This disclosure generally relates to an improved system for well boring and related hydraulic fracturing processes. More particularly, this disclosure relates to a sleeve that may be formed with some composite material to provide a stable and consistent low-friction surface, which surface may potentially improve the seating and uniform breaking of the related slip into segments in a fracking plug application.

Figure 5:
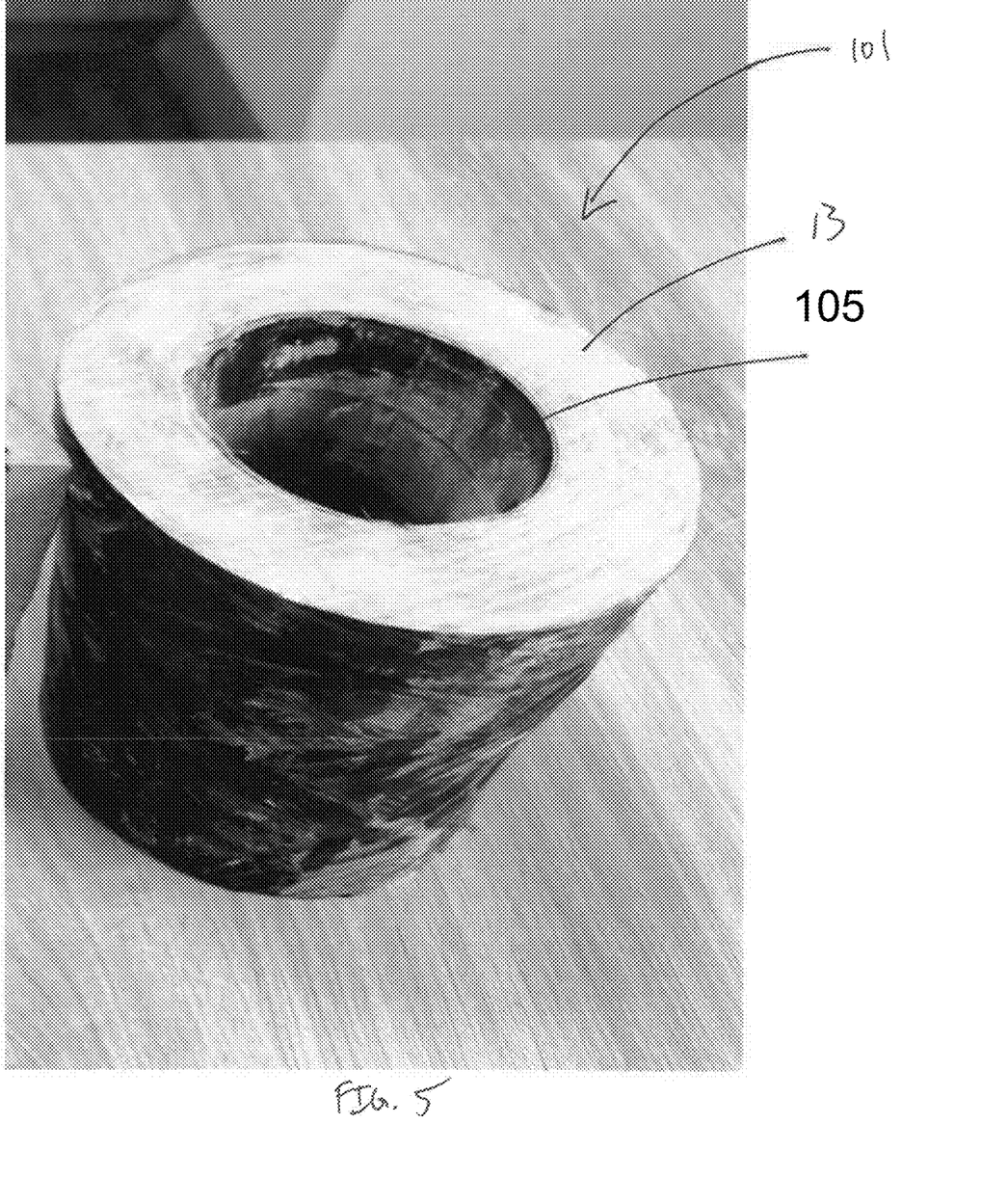
FIG. 5 depicts an additional top perspective view of the embodiment of a low-friction intermediate product of FIG. 3.
Figure 6:
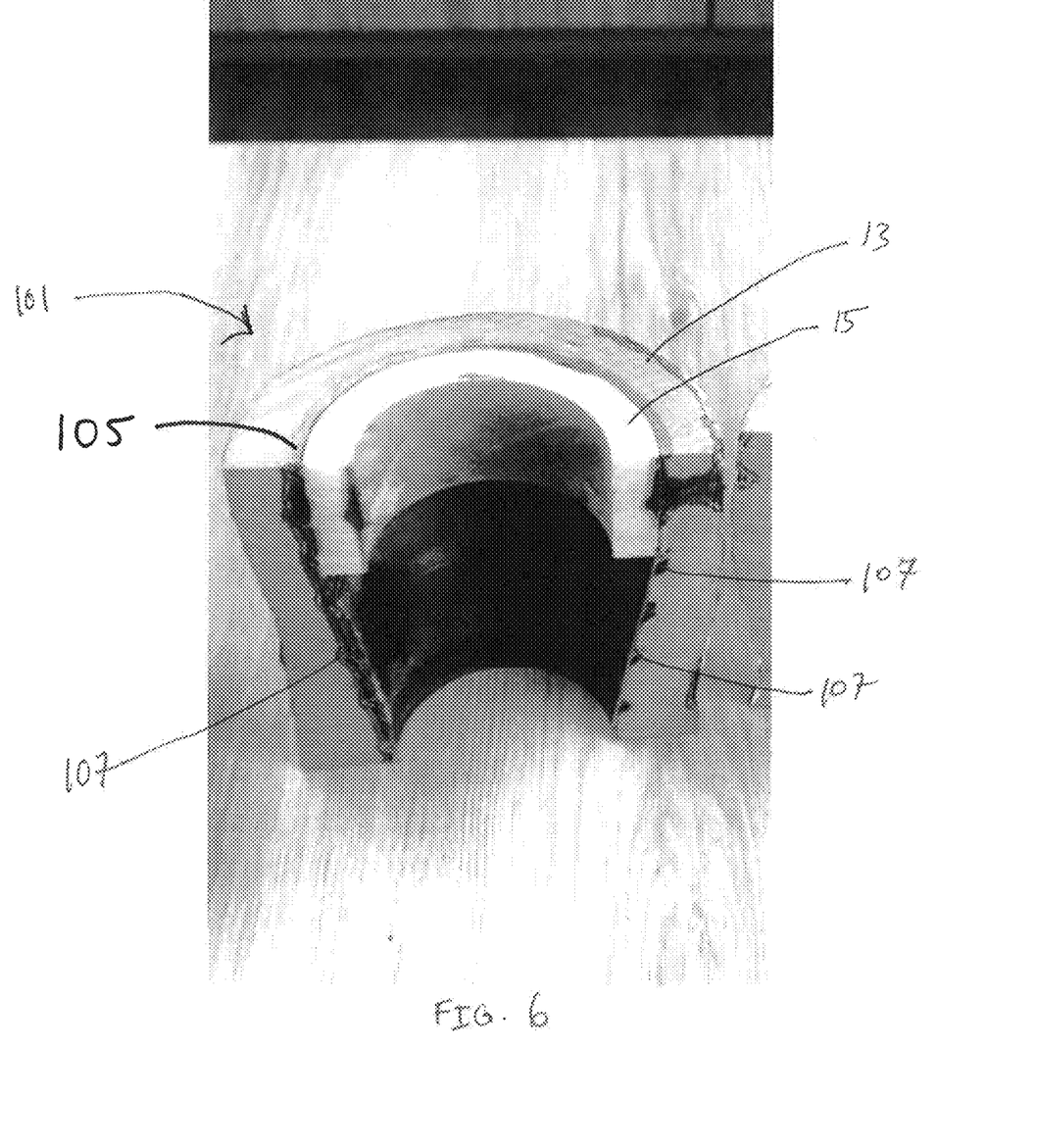
FIG. 6 depicts a cross-sectional view of the embodiment of a low-friction intermediate product of FIG. 3 including a spacer therein.

FIGS. 5 and 6 shows an embodiment of a low-friction slip intermediate product (101) in accordance with this disclosure. This is an intermediate product at least because, in some embodiments, the low-friction slip intermediate product (101) will be machined, or otherwise processed, into something else. For example, the embodiment of a low-friction slip intermediate product (101) depicted in FIGS. 5 and 6 is intended to be machined into a slip for use in a frac plug. In this application, the term "low-friction" means a friction coefficient or behavior that is acceptable in or suitable to a frac plug application, as would be understood by a person of ordinary skill in the art.

As shown in FIG. 6, the low-friction slip intermediate product (101) has several constituent parts, including, without limitation, a composite outer matrix (13), a spacer ring (15), and a low-friction plastic sleeve (105), which sleeve (105) may have one or more retention features (107). FIG. 6 shows a cross-sectional view of the low-friction slip intermediate product (101), while FIG. 5 shows a completed low-friction slip intermediate product (101) without any cross-sectioning and without the spacer ring (15). As can be seen from both of these figures, the overall shape of the low-friction slip intermediate product (101) is generally that of a truncated cone. In other embodiments, the low-friction slip intermediate product (101) may have any other shape, though the shape will typically include a hollow portion having a generally circular cross-section shape. In a number of embodiments, the overall shape of the low-friction slip intermediate product (101) will be at least partially conical or cylindrical, which conical or cylindrical shape may assist in the process of forming the composite outer matrix (13).

The relative positioning of the composite outer matrix (13), the spacer ring (15), and the low-friction plastic sleeve (105) is illustrated in the embodiment of the low-friction slip intermediate product (101) depicted in FIG. 6. The spacer ring (15) is typically formed on the inner most portion of the low-friction slip intermediate product (101). Then the sleeve (105) is formed around the spacer ring (15). Finally, the composite outer matrix is formed outside or, or onto, the sleeve (105). This layering may also be seen in FIG. 5 with the spacer (15) removed from within the interior of the low-friction slip intermediate product (101). The spacer (15) may have any shape, though typical embodiments will have a circular or ring-shaped cross-section shape.

Figure 4:
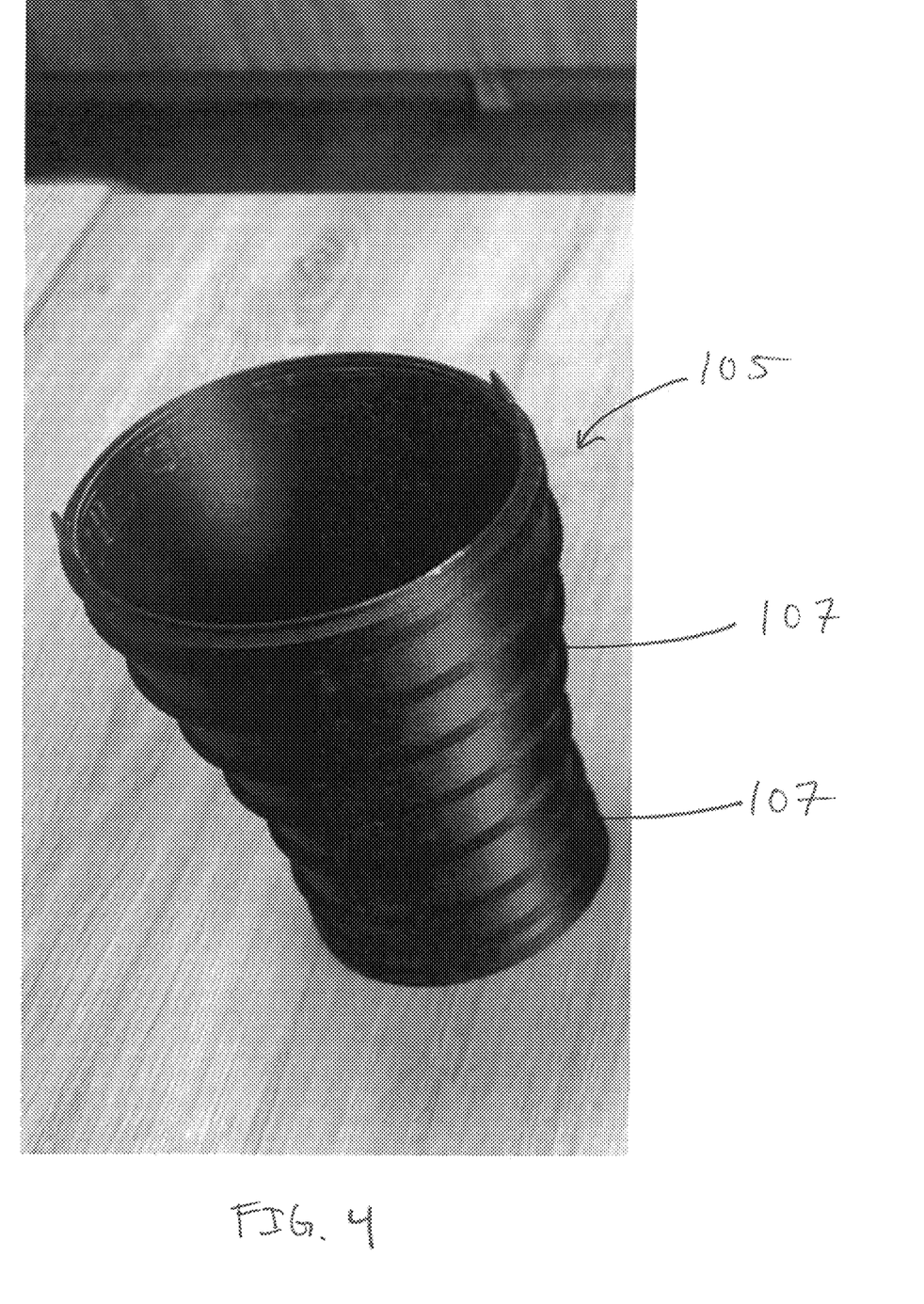
FIG. 4 depicts a low-friction plastic sleeve in accordance with this disclosure.

As seen in FIG. 4, the depicted embodiment of a sleeve (105) may also be shaped like a truncated cone. In this embodiment, the cone shape is not perfect, in a mathematical sense, at least because the exterior tangential angles of the narrowing from the large side to the small side are not equal. In any case, this shape is sufficiently cone-like because one side is wider than the other, and the cross-sections of the sleeve (105) are generally a ring (a circle with a concentric center portion removed). Further, as shown clearly in FIG. 4, the sleeve (105) may have one or more retention features (107) around the outer periphery of the sleeve (105). In the embodiment depicted in FIG. 4, the retention features (107) may also be considered to be a single retention feature, as they may be formed as a single rib, flange, or protrusion that spirals around at least most of the outer periphery of the sleeve (105). In other embodiments, one or more retention features (107) may be used having any shape that tends to solidify or strengthen the sleeve's (105) connection to a related composite outer matrix (13). Such retention features (107) may be, for example, circumferential ribs, hooks, nubs, or any other shape, feature, or treatment in other embodiments. It can be seen in FIG. 6 that the retention features (107) may extend into the surface of the related composite outer matrix (13) at various points along the height of the interior surface of the composite outer matrix (13).

The composite outer matrix (13) may be comprised of filament wound reinforcement/resin system; bulk molding compound (BMC) or sheet molding compound (SMC); or other similar material(s) known to persons of ordinary skill in the art. The material for the spacer (15) may be anything that will provided the needed mechanical support while the low-friction slip intermediate product (101) is being built. At some point during manufacturing of the end product slip, the spacer (15) will typically be removed.

In some embodiments, the low-friction slip intermediate product (101) may be used to fabricate a slip for use with a frac plug. Typically, this fabrication process will involve designing the slip to expand when forced onto its related cone, which expansion would typically be intended to hold the frac plug in place within the relevant wellbore. In other embodiments, the slip may be used to provide a low-friction interior surface to the composite matrix slip, which slip may have another purpose than securing a frac plug. In any case, the low-friction sleeve (105) may provide a consistent low-friction surface, typically for sliding applications.

The sleeve (105) may be formed of any material. In some embodiments, the sleeve (105) may be formed of any plastic material or thermoset material. In yet other embodiments, the sleeve (105) may be formed of any moldable material, such as a BMC or SMC compound, discussed elsewhere in this disclosure. In yet other embodiments, the sleeve (105) may be formed of a mixture of any of the above materials.

Figure 7:
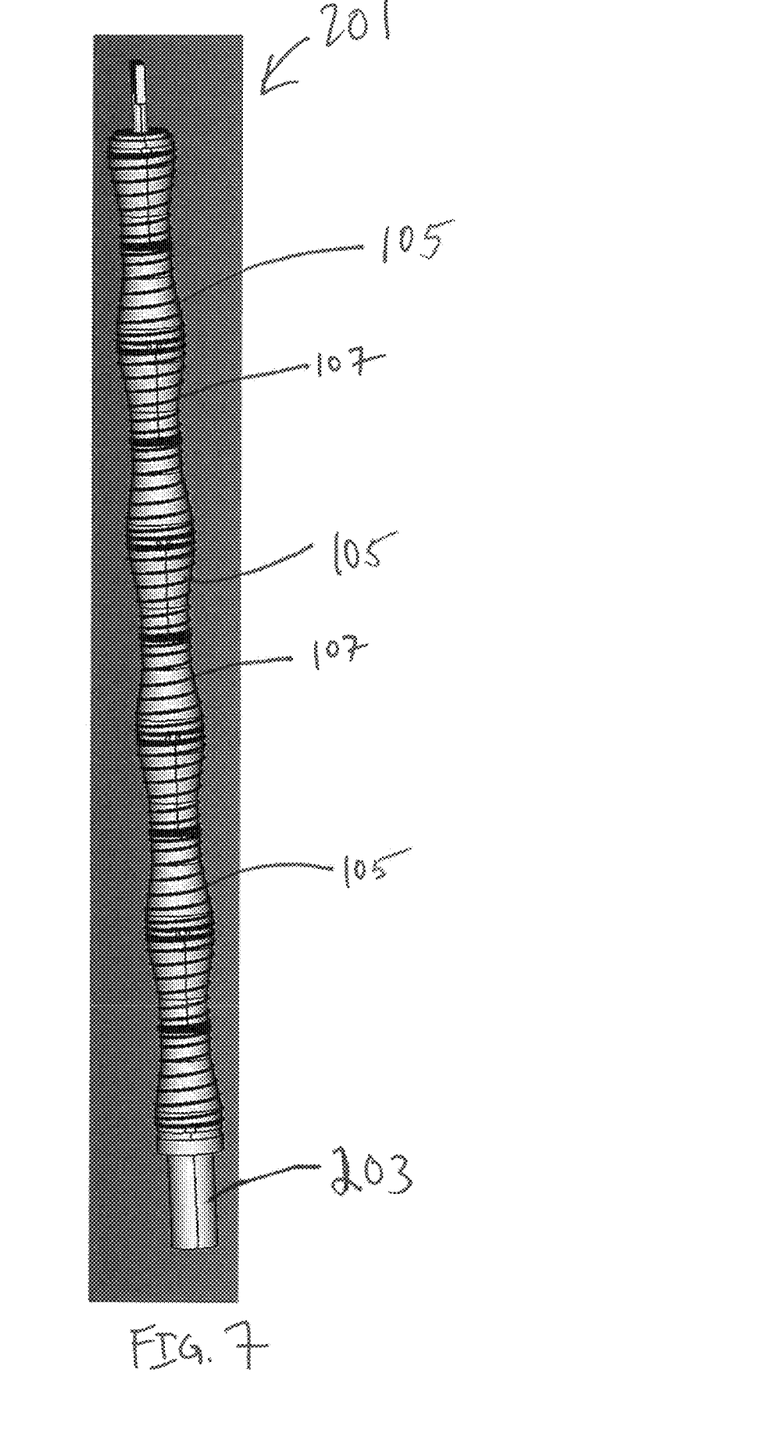
FIG. 7 depicts an embodiment of a workpiece including ten low-friction plastic sleeves of FIG. 4 mounted onto a mandrel.
Figure 8:
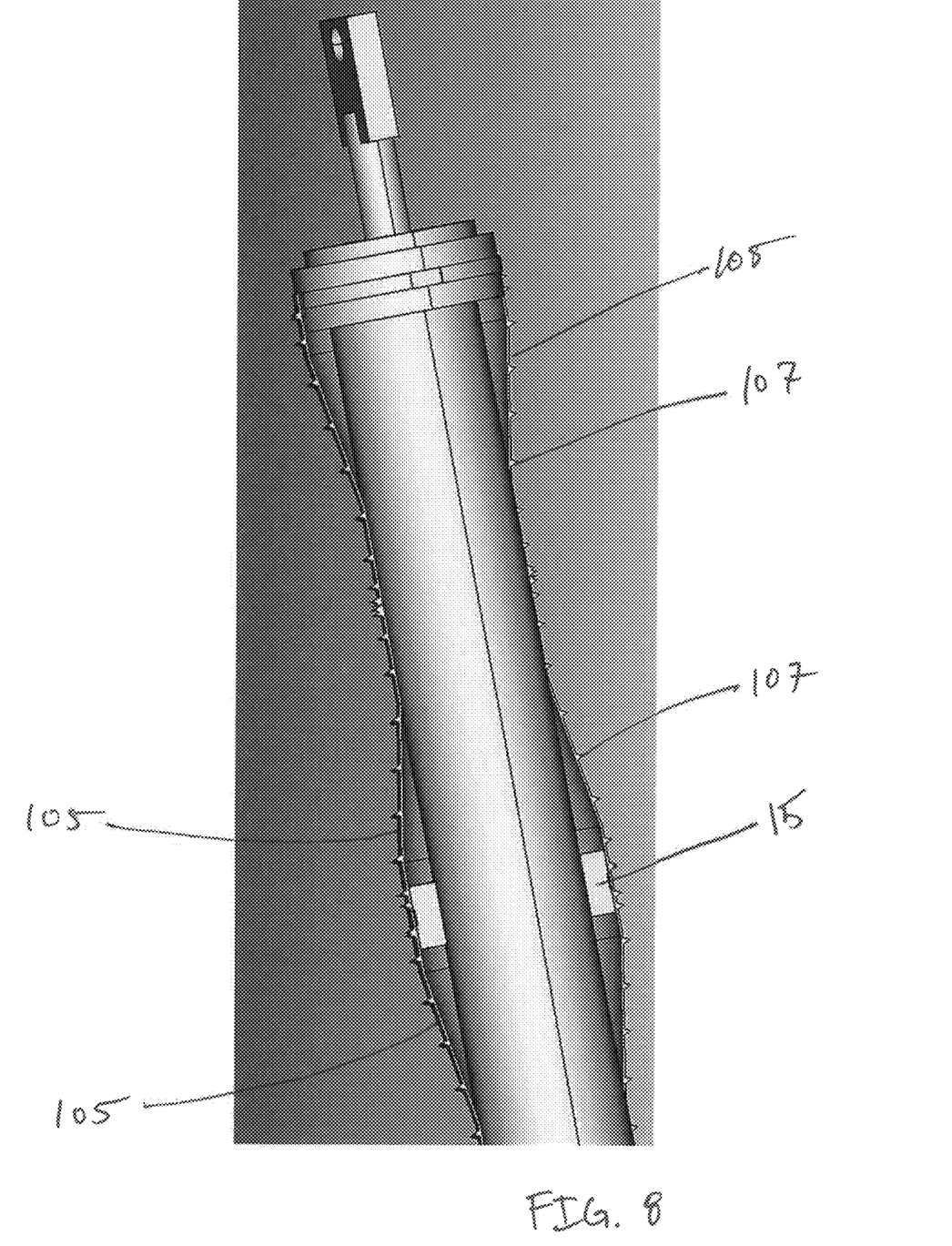
FIG. 8 depicts a cutaway perspective of a portion of the workpiece of FIG. 7.

An embodiment of a method for making one or more low-friction slip intermediate products (101) will now be described with reference to FIGS. 7, 8, 9, 10, 11, 12, 13, and 14. Starting with FIG. 7, one or more sleeves (105) may be placed onto a mandrel (203) to create a low-friction slip intermediate product workpiece (201). In FIG. 7, the workpiece (201) includes ten distinct sleeves (105) arranged by alternating ends. Other numbers of sleeves (105) and orientations on the mandrel (203) may be used in other embodiments. Although not visible in FIG. 7, one or more spacers (15) may be used at or around the widest portions (in an axial direction) of each of the sleeves (105). FIG. 8 shows a cross-sectional view of a portion of the workpiece (201), wherein the spacer (15) is clearly visible at the widest portion of two adjacent sleeves (105). As can also be seen in FIGS. 7 and 8, the retention features (107) may be visible on the exterior surface of the workpiece (201). Once all sleeves (105) have been loaded onto the mandrel (203) to make a workpiece (201), the workpiece (201) may be processed further.

Figure 9:
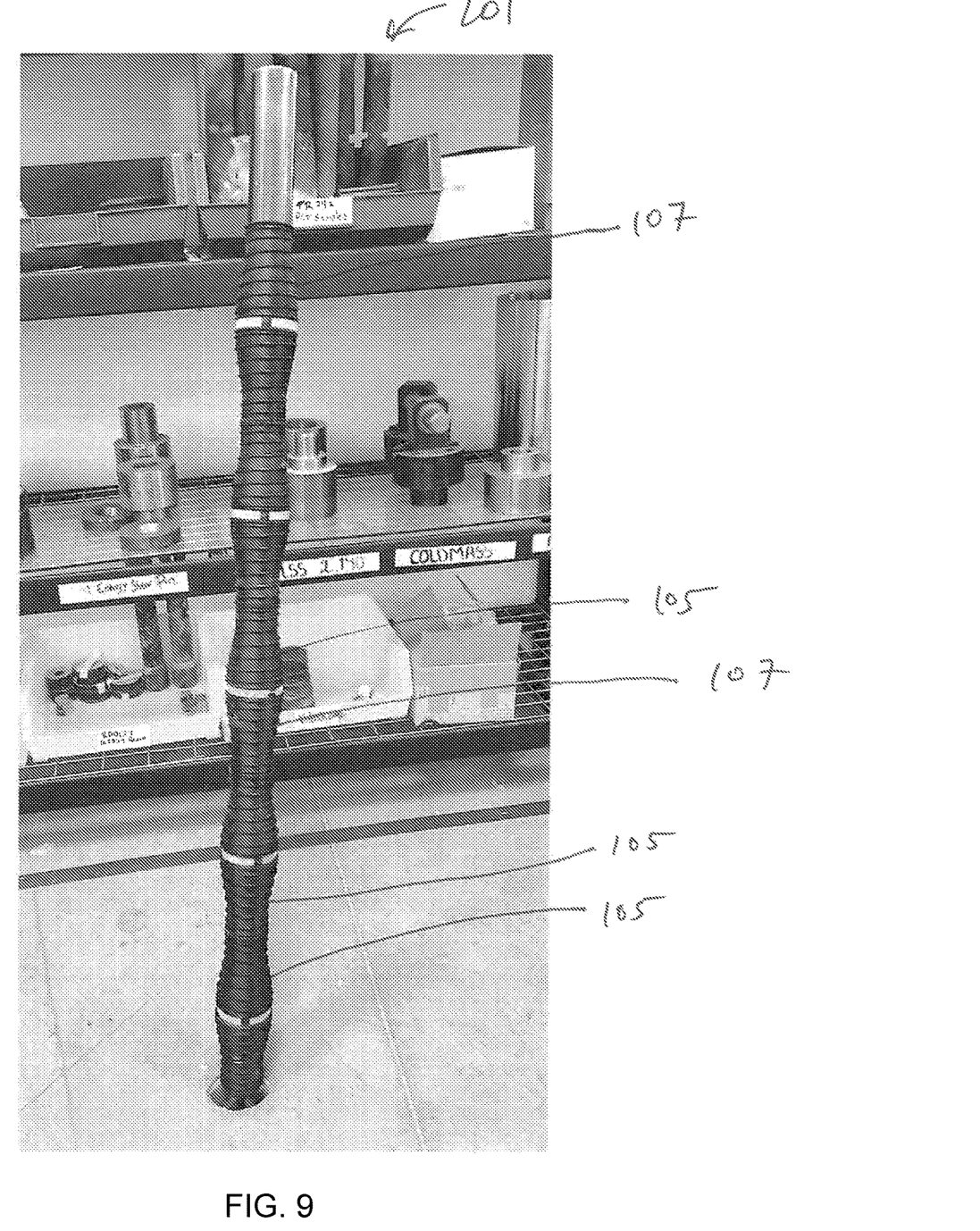
FIG. 9 depicts another embodiment of a workpiece in accordance with this disclosure, wherein the workpiece is temporarily seated on the floor of the relevant space.
Figure 10:
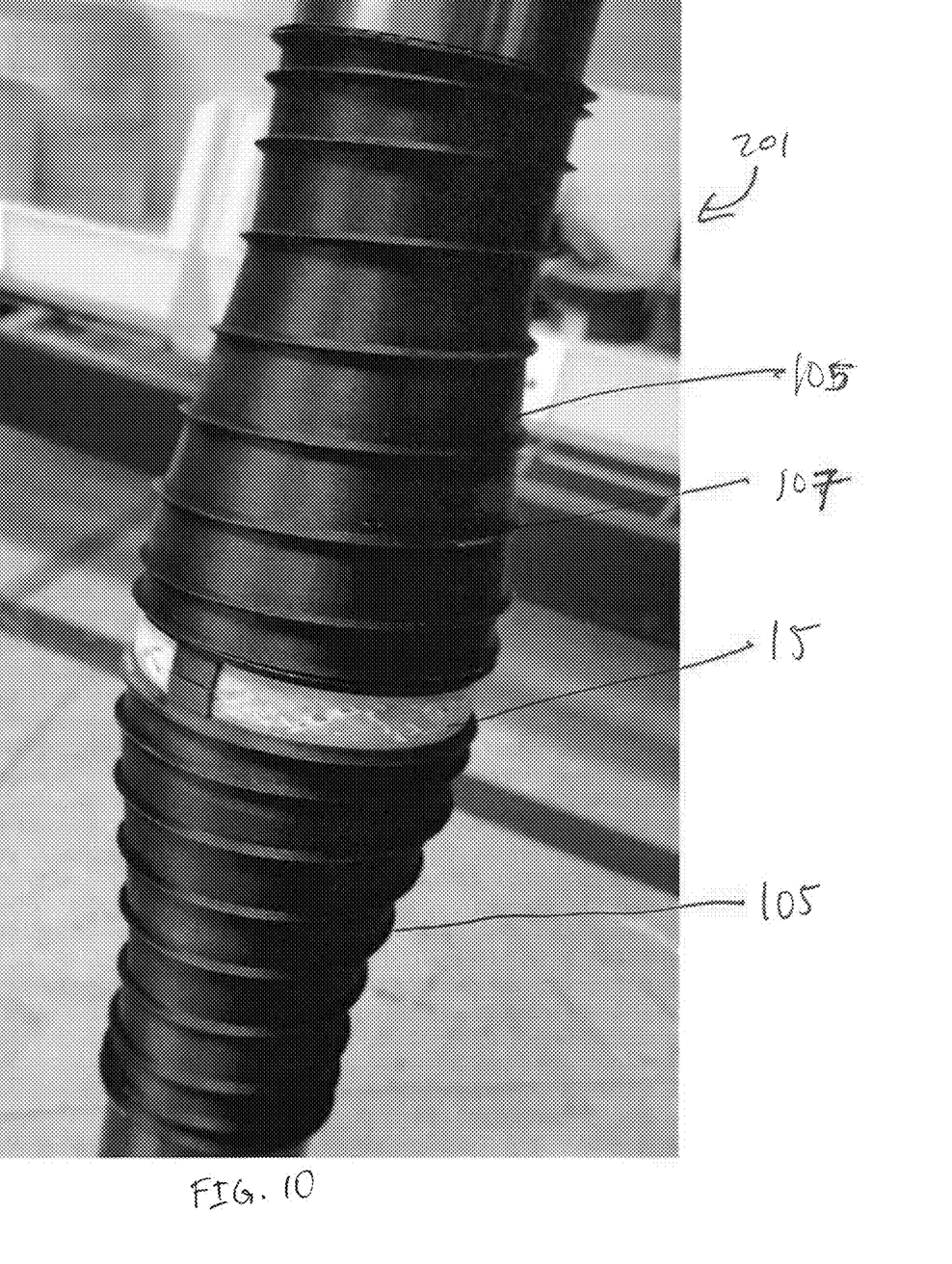
FIG. 10 depicts a close up view of a portion of the embodiment of a workpiece of FIG. 9.

FIG. 9 depicts the workpiece (201) being temporarily mounted in a hole within the floor of the relevant space. This may allow for inspection of the workpiece (201). FIG. 10 shows a close up view of a portion of the workpiece (201), where the sleeves (105) and their retention features (107) are apparent. Also visible is an embodiment of a spacer (15). Next, the workpiece may be loaded into a filament winding machine, or into another similar structure that will allow for the outer composite matrix material (13) to be formed around the sleeve (105).

Figure 11:
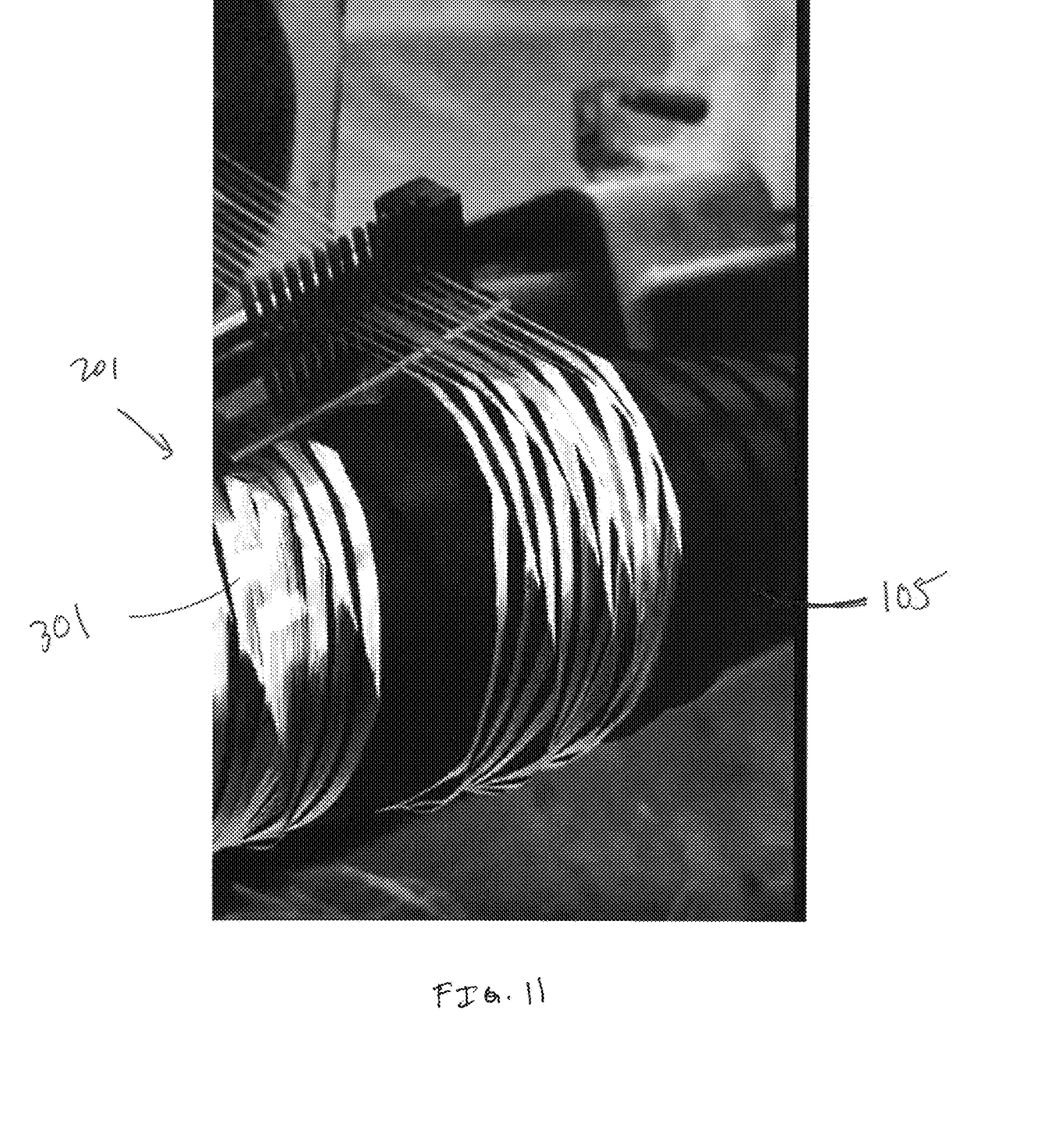
FIG. 11 depicts a close up view of a portion of the embodiment of a workpiece of FIG. 9 being filament wound and including a number of filaments.

As can be seen in FIG. 11, in the depicted embodiment, the workpiece (201) may then be filament wound. This process typically involves winding filaments or fibers (301) under tension over the workpiece (201) by rotating the mandrel (203). In an embodiment, the workpiece (201) rotates around the axis of the mandrel (203) (which is collinear with the axis of the sleeves (105)) while a delivery eye or eyes on a carriage of the filament winding machine traverses horizontally in line with the axis of the rotating workpiece (201) (along the length of the workpiece (201)), laying down filaments or fibers (301) in a desired pattern or angle to the rotational axis. Typical filaments may be glass or carbon and, in some embodiments other than the depicted embodiment, may be impregnated with resin by passing through a bath as they are wound onto the workpiece (201).

Figure 12:
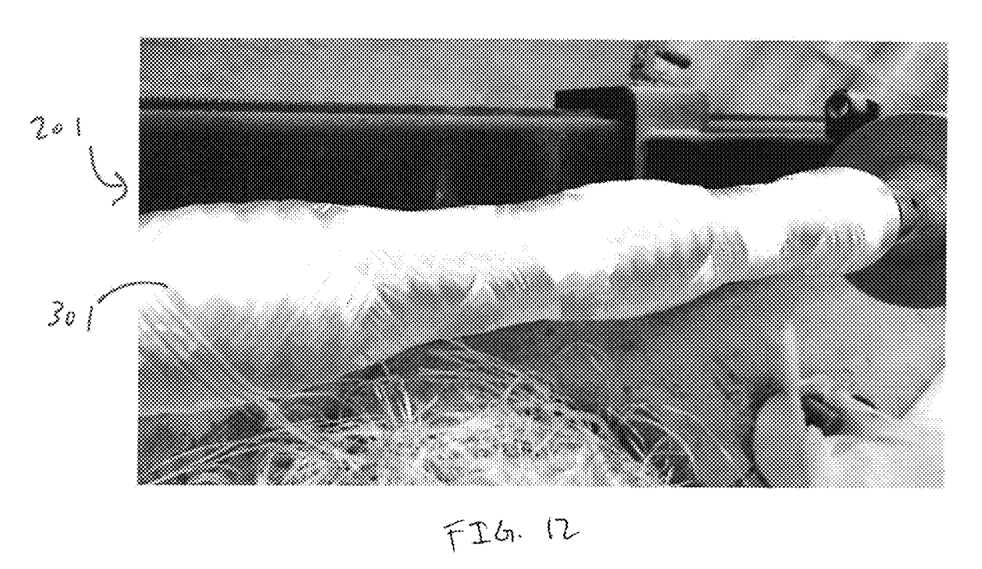
FIG. 12 depicts the embodiment of a workpiece of FIG. 9 after being at least partially filament wound in a non-resin process.
Figure 13:
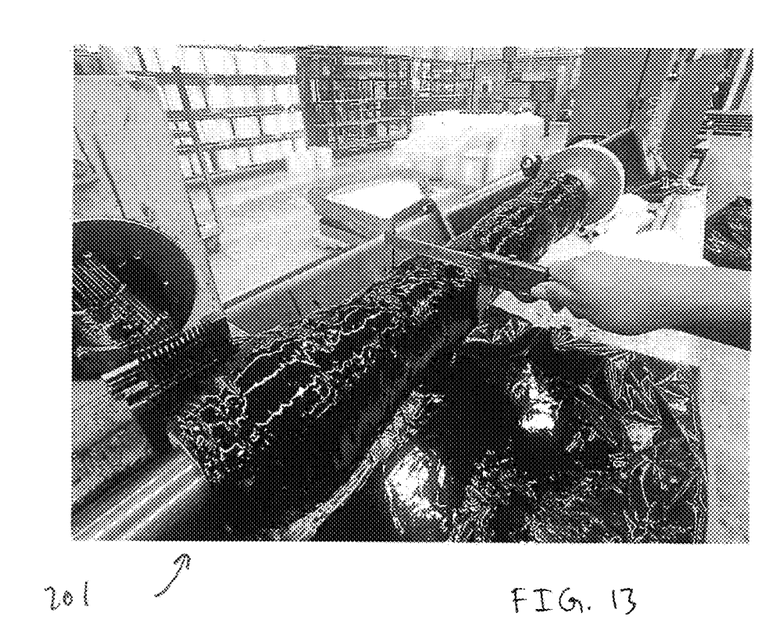
FIG. 13 depicts the embodiment of a workpiece of FIG. 12 being filament wound in a resin process.
Figure 14:
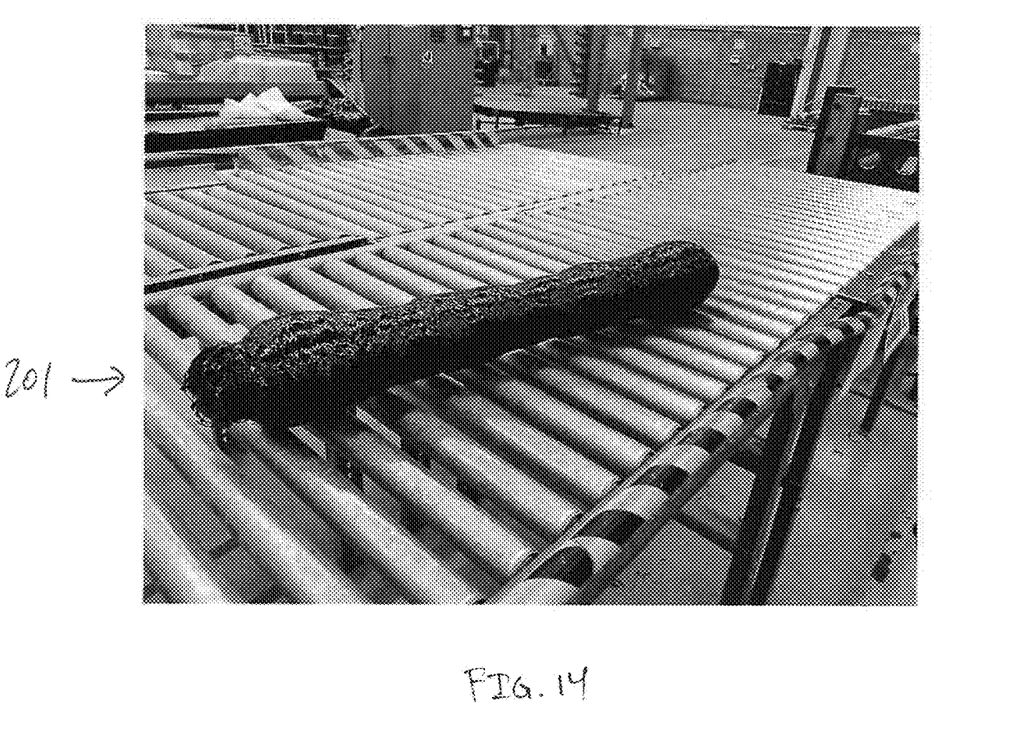
FIG. 14 depicts the embodiment of a workpiece of FIG. 12 after being filament wound in a resin process.

The process depicted in FIG. 11, and the final product in FIG. 12, do not include any resin. This non-resin process is not standard, but is included in order to better illustrate the filament winding process. In a typical process, the filaments are coated with a resin before the filaments are wrapped onto a given sleeve (105) to be wrapped, as shown in FIGS. 13 and 14.

In some embodiments, bulk molding compound or sheet molding compound (or another material) maybe used in place of one or more of the filaments. In a typical molding operation, the cone may be molded into the part using a specially formulated BMC or SMC compound, depending on the application. Typically, the cone and compound are introduced to a heated mold and pressed to make the final part. Typically, the mechanical bonding and chemical preparation for bonding of the liner to the composite matrix or material are unique for or specific to the application. The surface area of the outer surface of the cone may be increased with mechanical abrasion. The chemical adhesion bonding may be further enhanced with a chemical additive. The bonding of the liner to the outer composite matrix tend to be a focus for such applications.

Any amount of winding may be provided, and in any pattern. One such pattern is depicted in FIG. 12. The process may continue until the workpiece (201) has reached an intended thickness. Once the workpiece (201) is covered to the desired thickness, the resin of the filaments may be cured. Depending on the resin system and its cure characteristics, the workpiece (201) may be autoclaved, heated in an oven, rotated under radiant heaters, or treated otherwise until the part is cured. Any resin system known in the art may be used.

Once the resin has cured, the workpiece (201) may be further processed (via cutting or other machining) into individual low-friction slip intermediate products (101). This process may include removing all of the built-up material (primarily the filament and resin materials) from the mandrel (203), or the material may be processed on the mandrel (203) itself. In some embodiments, the mandrel (203) may become a permanent part of the finished product.

Figure 15:
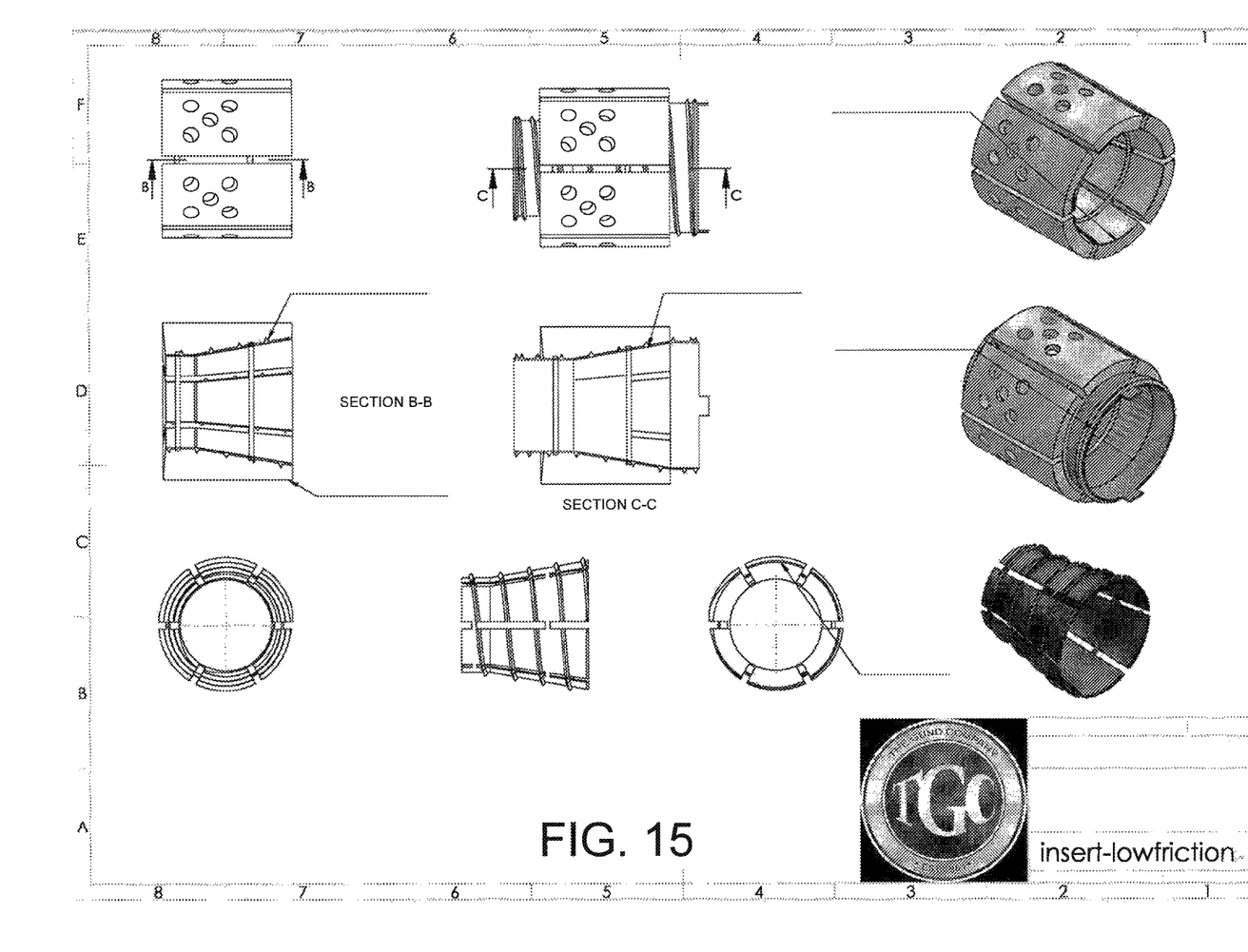
FIG. 15 depicts an embodiment of a low-friction plastic sleeve being used to produce a slip including a variety of views of various steps during the process.
Figure 16:
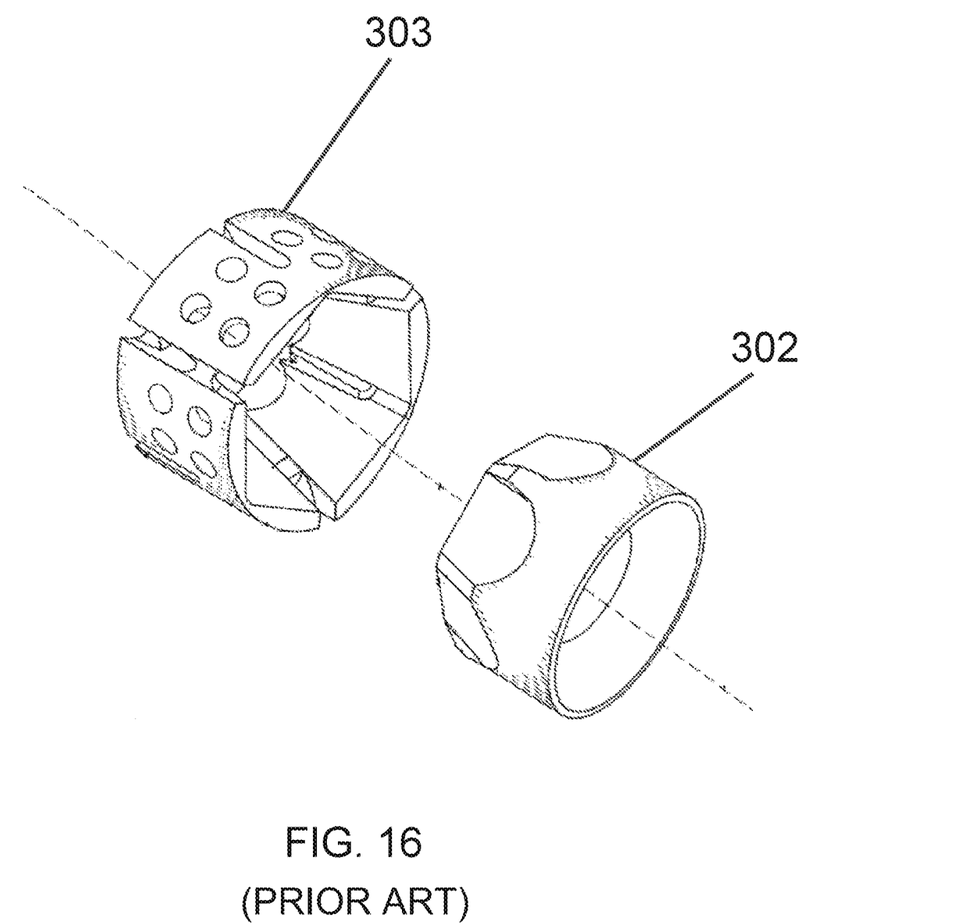
FIG. 16 depicts a low-friction intermediate product of FIG. 3 after subsequent machining and in the presence of a related cone.

FIG. 15 depicts an embodiment of a low-friction plastic sleeve being used to produce a slip including a variety of views of various steps during the process. FIG. 16 depicts a low-friction intermediate product after subsequent machining into a slip (303) and in the presence of a related cone (302). One potential advantage of the systems and methods described herein is that the interior of the intermediate product will typically require no further machining, unlike prior art devices and processes. Instead, the interior of the sleeve may provide the finished interior surface. Typically, if some subsequent machining on the interior is performed, the machining performed will be less in expense and/or time than would a process be if the sleeve was not used.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "conical" are purely geometric constructs and no real-world component is a true "conical" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

What is claimed is:

1. A sleeve for forming a slip assembly of a frac plug, the sleeve comprising:
   a main body having a truncated cone shape with a hollow interior;
   a first end that is a substantially circular opening having a first diameter and forming a first end of the hollow interior;
   a second end that is a substantially circular opening having a second diameter and forming a second end of the hollow interior;
   at least one retention feature configured to retain a filament to be subsequently wrapped around the sleeve, the main body and the at least one retention feature being formed of a thermoset material;
   one or more filaments wrapped around the main body,
   wherein the sleeve has an at least a partially conical exterior surface configured to provide an at least partial interior surface to a subsequently produced slip ring, and wherein the first diameter is larger than the second diameter.

2. The sleeve for forming a slip assembly of a frac plug of claim 1, wherein the one or more filaments surrounds the main body.

3. The sleeve for forming a slip assembly of a frac plug of claim 1, wherein the main body and the at least one retention feature are formed integrally.

4. An intermediate product for forming a slip assembly of a frac plug, the intermediate product comprising:
   a first sleeve, the first sleeve comprising:
      a first main body being formed of a thermoset material and having a generally truncated cone shape with a hollow interior;
      a first end that is a substantially circular opening having a first diameter and forming a first end of the hollow interior; and
      a second end that is a substantially circular opening having a second diameter and forming a second end of the hollow interior,
      wherein the first diameter is larger than the second diameter, and
      wherein the sleeve has an at least a partially conical exterior surface configured to provide an at least partial interior surface to a subsequently produced slip ring;
   a spacer located within and in contact with the first sleeve, the spacer having a generally ring shape; and
   a composite outer matrix formed on the outside surface of the first sleeve, the composite outer matrix comprising at least one filament and a resin;
   wherein the intermediate product has a generally truncated cone shape.

5. The intermediate product for forming a slip assembly of a frac plug of claim 4, further comprising a mandrel onto which the intermediate product is mounted, wherein the mandrel is positioned within the interior of the spacer and the first sleeve.

6. The intermediate product for forming a slip assembly of a frac plug of claim 5, further comprising a second intermediate product for forming a slip assembly of a frac plug mounted on the mandrel.

7. The intermediate product for forming a slip assembly of a frac plug of claim 6, wherein the second intermediate product is oriented on the mandrel in an opposite direction compared to orientation of the first intermediate product on the mandrel.

8. The intermediate product for forming a slip assembly of a frac plug of claim 7, wherein the first sleeve includes at least one retention feature configured to retain a filament to be subsequently wrapped around the sleeve formed around the first main body.

9. A method of making an intermediate product for forming a slip assembly of a frac plug, the method comprising:
   forming a sleeve, the sleeve comprising:
      a main body being formed of a thermoset material and having a generally truncated cone shape with a hollow interior;
      a first end that is a substantially circular opening having a first diameter and forming a first end of the hollow interior;
      a second end that is a substantially circular opening having a second diameter and forming a second end of the hollow interior; and
      at least one retention feature configured to retain a filament to be subsequently wrapped around the sleeve formed around the main body,
      wherein the at least one retention feature is formed of the thermoset material,
      wherein the first diameter is larger than the second diameter, and
      wherein the sleeve has an at least a partially conical exterior surface configured to provide an at least partial interior surface to a subsequently produced slip ring, and
   placing the low-friction sleeve on a mandrel.

10. The method of making an intermediate product for forming a slip assembly of a frac plug of claim 9, further comprising a step of placing a spacer within the sleeve on the mandrel.

11. The method of making an intermediate product for forming a slip assembly of a frac plug of claim 10, further comprising a step of filament winding onto the sleeve on the mandrel using at least one filament and a resin.

12. The method of making an intermediate product for forming a slip assembly of a frac plug of claim 11, further comprising a step of removing the sleeve from the mandrel.

13. The method of making an intermediate product for forming a slip assembly of a frac plug of claim 12, further comprising a step of molding a compound onto the sleeve on the mandrel.

14. The method of making an intermediate product for forming a slip assembly of a frac plug of claim 12, further comprising a step of placing a second sleeve on the mandrel.

15. The method of making an intermediate product for forming a slip assembly of a frac plug of claim 14, further comprising a step of filament winding the sleeve and the second sleeve on the mandrel using at least one filament and a resin.

16. The method of making an intermediate product for forming a slip assembly of a frac plug of claim 15, further comprising a step of removing the sleeve and the second sleeve from the mandrel.

17. The method of making an intermediate product for forming a slip assembly of a frac plug of claim 16, further comprising a step of separating the sleeve from the second sleeve.

18. The method of making an intermediate product for forming a slip assembly of a frac plug of claim 16, further comprising a step of molding a compound onto the sleeve and the second sleeve on the mandrel.

* * * * *